US012179955B2

(12) United States Patent
Khan

(10) Patent No.: US 12,179,955 B2
(45) Date of Patent: Dec. 31, 2024

(54) RECYCLABLE MOULDED PULP CONTAINER

(71) Applicant: Polyco Healthline Limited, Morden (GB)

(72) Inventor: Fuad Khan, Morden (GB)

(73) Assignee: Polyco Healthline Limited, Morden (GB)

( * ) Notice: Subject to any disclaimer, the term of this patent is extended or adjusted under 35 U.S.C. 154(b) by 531 days.

(21) Appl. No.: 17/283,623

(22) PCT Filed: Oct. 8, 2019

(86) PCT No.: PCT/GB2019/052853
§ 371 (c)(1),
(2) Date: Apr. 8, 2021

(87) PCT Pub. No.: WO2020/074885
PCT Pub. Date: Apr. 16, 2020

(65) Prior Publication Data
US 2021/0347518 A1    Nov. 11, 2021

(30) Foreign Application Priority Data
Oct. 8, 2018    (GB) ..................... 1816378

(51) Int. Cl.
*B65D 25/14*    (2006.01)
*B32B 7/06*    (2019.01)
(Continued)

(52) U.S. Cl.
CPC .................. *B65D 1/34* (2013.01); *B32B 7/06* (2013.01); *B32B 27/10* (2013.01); *B32B 27/36* (2013.01);
(Continued)

(58) Field of Classification Search
CPC .......... B65D 25/16; B65D 25/14; B65D 1/28; B65D 1/34; B32B 7/06; B32B 27/10; B32B 2439/70
(Continued)

(56) References Cited

U.S. PATENT DOCUMENTS 5,676,276 A * 10/1997 Zielinski ................ A47G 23/06
220/574

FOREIGN PATENT DOCUMENTS

EP    0974522    1/2000
EP    1905699    4/2008
(Continued)

OTHER PUBLICATIONS

International Search Report and Written Opinion from Application PCT/GB2019/052853 dated Dec. 2, 2019.
(Continued)

*Primary Examiner* — Stephen J Castellano
(74) *Attorney, Agent, or Firm* — Troutman Pepper Hamilton Sanders LLP; Ryan A. Schneider; Ginger G. Turner

(57) ABSTRACT

A moulded pulp container for food includes a main body formed from a moulded pulp material and a pulp tab portion. The main body includes a base, upstanding walls extending from the base, and an outer edge defining a container having an inner surface and an outer surface. The pulp tab portion is connected to and arranged outboard of the outer edge. The pulp tab portion has an upper surface and a lower surface. A barrier membrane laminated to the inner surface of the container and the upper surface of the pulp tab portion is removable when the pulp tab portion is detached from the main body, such that the barrier membrane remains bonded to both the main body and the pulp tab portion, which
(Continued)

enables the barrier membrane to be peeled from the main body by pulling the pulp tab portion.

16 Claims, 3 Drawing Sheets

(51) Int. Cl.
    *B32B 27/10*     (2006.01)
    *B32B 27/36*     (2006.01)
    *B65D 1/34*     (2006.01)
    *B65D 81/34*     (2006.01)
    *D21J 3/00*     (2006.01)

(52) U.S. Cl.
    CPC ......... *B65D 25/14* (2013.01); *B65D 81/3453* (2013.01); *D21J 3/00* (2013.01); *B32B 2307/7265* (2013.01); *B32B 2439/70* (2013.01); *B65D 2565/385* (2013.01)

(58) Field of Classification Search
    USPC ........................................................ 220/657
    See application file for complete search history.

(56) References Cited

FOREIGN PATENT DOCUMENTS

| | | |
|---|---|---|
| GB | 2571836 | 9/2019 |
| JP | 2002096813 | 4/2002 |
| JP | 2003305796 | 10/2003 |
| JP | 2005186983 | 7/2005 |
| WO | 0104007 | 1/2001 |
| WO | 2009/014483 | 1/2009 |
| WO | 2017053937 | 3/2017 |
| WO | 2019190324 | 10/2019 |

OTHER PUBLICATIONS

Search Report from Application No. GB1816378.2 dated Mar. 19, 2019.
Search Report from GB Application No. 1816378.2 dated Mar. 19, 2019.
Exam Report from GB Application No. 1919291.3 dated Nov. 10, 2020.
Moulded Pulp Wikipedia, https://en.wikipedia.org/w/index.php?title=Molded_pulp&oldid=903036994.

* cited by examiner

RECYCLABLE MOULDED PULP CONTAINER

FIELD OF INVENTION

The present invention relates to a recyclable moulded pulp container, and in particular a food container for containing and preserving food, such as a container for hot food or food to be heated, having a removable plastic barrier membrane.

BACKGROUND

Food products such as pre-prepared ready meals and take away food have conventionally been packaged in plastic or metal trays. Food of this type is either served hot, or heated by the user, and as such the tray in which the food is contained must be capable of withstanding high temperatures. The food trays must also be able to contain the food without leakage or mechanical failure due to liquid saturation. However, there is increasing pressure to move away from the use of materials such as plastic and metal in disposable items such as food trays, and instead use recyclable and sustainable materials.

Due to tightening regulations for packaging waste and consumer demand for environmentally friendly packaging, moulded pulp is now increasingly used by as a packaging material. It is known to use recyclable pulp material in the production of containers for food items such as eggs and fruit and vegetables. However, it has been more difficult to achieve a pulp packaging product that is able to meet the material demands of a tray for heated food.

The absorbent properties of pulp are problematic when containing food with a liquid content. It is known to barrier pulp material using sizing agents such as resins. However, such materials are not able to withstand the high temperatures required of a container for heated food. As a solution, pulp food trays are provided with a plastic coating or liner that waterproofs the inner surface of the container and protects the pulp in use. However, the use of a plastic lining material is undesirable in a product that is intended to be recyclable and environmentally friendly. The provision of a plastic lining on a pulp products present difficulties in separating the pulp from the plastic in order to recover the pulp for recycling. During the processing of pulp for recycling, the waste pulp is hydro pulped to create a slurry and held in suspension in a liquid tank. Small quantities of plastic will float to the surface of the liquid and can be removed. However, if products contain significant quantities of plastic i.e. 5% of plastic by weight or above, then removal of the plastic is not possible with conventional industrial scale recycling equipment. It is for this reason that only a very small percentage of disposable coffee cups are recycled.

It is therefore desirable to provide an improved pulp food container which addresses the above described problems and/or which offers improvements generally.

SUMMARY

According to the present invention there is provided a moulded pulp food container as described in the accompanying claims. According to the present invention there is also provided a method of forming a moulded pulp food container as described in the accompanying claims.

In an embodiment of the invention there is provided a moulded pulp food container comprising a main body formed from a moulded pulp material, the main body comprising a base and upstanding walls extending from the base defining a container having an inner surface and an outer surface. A barrier membrane is bonded to the inner surface of the container. The barrier membrane includes a tab portion extending past an outer edge of the main body defining a pull tab that may be gripped to peel the barrier membrane from the main body. The tab portion of the barrier membrane is not bonded to the main body and as such enables the barrier membrane to be gripped without gripping the main body. In this way, the barrier membrane may be pulled to peel the barrier membrane away from the pulp container body. This allows the user to separate the barrier membrane from the pulp container at the point of disposal, such that the pulp and plastic can be processed in different recycling streams, and recycling of the pulp is made significantly easier without the requirement to remove the plastic during the recycling process. The term "food" includes any foodstuff including beverages and including hot beverages such as tea and coffee. In particular the container is suitable for containing hot food and/or for containing food as it is heated, for example in conventional oven or microwave oven. Locating the tab portion past, or "outboard" of the outer edge of the container ensures the tab is positioned outwardly of the boundary region with the lidding film. This prevents the tab from being delaminated and/or directly pulled and detached when the lidding is removed.

A pulp tab portion may be connected to the tab portion of the barrier membrane. The pulp tab portion reinforces the tab portion of the barrier membrane and prevents it from tearing when the tab is pulled.

The pulp tab portion is preferably a removable tab portion frangibly connected to the main body, and the barrier plastic membrane is bonded to the main body and the removable tab portion such that when the removable tab portion is detached from the main body it remains bonded to the barrier membrane to enable the barrier membrane to be peeled from the main body by pulling the removable tab portion. The term "frangible" means any mechanically weakened connection that enables the tab to be readily detached from the main body. Forming the pulp tab as part of the main body advantageously provides a support substrate for the tab portion of the barrier membrane during lamination, as well as providing the above described reinforcement.

The removable tab portion is preferably integrally moulded with the main body and a tear seam is defined between the removable tab portion and the main body. The tear seam may be formed post-moulding or during the moulding process.

The barrier membrane preferably extends across the tear seam in an unbroken manner. Specifically, the barrier membrane is not weakened along the tear seam which mitigates the risk to the membrane tearing as the tab is pulled to peel the membrane from the main body.

The main body preferably includes a rim or lip portion arranged at the upper edge of the upstanding walls and the tab portion is frangibly connected to the lip portion. The lip portion may be formed by a flange extending substantially horizontally from the upper edge of the walls. The lip portion provides a horizontal surface to which a plastic cover film may be heat sealed or otherwise bonded along a bonding region.

The tab portion preferably extends outwardly from the peripheral edge of the lip portion.

The barrier membrane is preferably a polymer film, which may be a plastic, which may be Polyethylene Terephthalate.

In another embodiment there is provided a method of forming a moulded pulp container for food comprising moulding a main body from a pulp material, the main body comprising a base and upstanding walls extending from the base defining a container or enclosure having an inner surface and an outer surface; and bonding a barrier membrane to the inner surface of the main body such that a tab portion of the barrier membrane extends past an outer edge of the main body to define a pull tab that may be gripped to peel the barrier membrane from the main body.

The method may further comprise integrally moulding a removable tab portion with the main body, the removable tab portion being located at an outer edge of the main body; and forming a tear seam between the removable tab portion and the main body. The barrier membrane is bonded to the removable tab portion and the inner surface of the main body. The term "tear seam" may comprise any line or region of mechanical weakening and may for example comprise a region of reduced material thickness, scored or compressed material, or series of perforations.

The tab portion of the barrier membrane is preferably bonded to the removable tab portion such that both tabs may be gripped simultaneously.

The method may further comprise integrally moulding a pulp tab portion with the main body, the pulp tab portion being located at an outer edge of the main body, wherein the barrier membrane is bonded to the pulp tab portion and the inner surface of the main body; and separating the pulp tab portion from the main body after the barrier membrane has been bonded to the main body and the pulp tab portion such that the tab portion of the barrier membrane remains connected to the barrier membrane with barrier membrane bonded to both the main body and the pulp tab portion. The tab may be separated by cutting, scoring or any other suitable means of forming a physical break between the main body and the tab portion.

The barrier membrane is preferably laminated to the main body and to the pulp tab portion in a simultaneous laminating step to form a laminar arrangement of materials.

In another embodiment there is provided a moulded pulp container for food comprising a main body formed from a moulded pulp material, the main body comprising a base, upstanding walls extending from the base defining a container having an inner surface and an outer surface, and an outer return edge extending vertically downwards from an upper edge of the upstanding walls having an inner surface facing the upstanding walls and an outer surface facing outwardly away from the upstanding walls; a pulp tab portion connected to and arranged outboard of the vertical return edge, the tab portion extending in a substantially horizontal direction relative to the vertical outer return wall and having an upper surface and a lower surface; and a barrier membrane bonded to the inner surface of the upstanding walls, the outer surface of the return wall and the upper surface of the tab portion. A tear seam is formed between the pulp tab portion and the vertical return wall of the main body to enable the pulp tab portion to be detached from the main body, and the barrier membrane is bonded to the main body and the removable tab portion such that when the removable tab portion is detached from the main body the barrier membrane remains bonded to both the main body and the tab portion to enable the barrier membrane to be peeled from the main body by pulling the tab portion. The return wall of the main body increases the strength of the rim of the container, helping the container retain its shape in use. Providing a return wall also advantageously offsets the peripheral edge bonding between the main body and the barrier membrane away from the upper rim of the container to which the lidding film is bonded, thereby preventing delamination between the barrier membrane and the main body when the lidding film is removed in use. By locating the tab portion outboard of the vertical return wall, it is possible to form the tear seam in the tab portion, and trim the tab portion, using a vertical cut or press tool. This would not be possible if the tab were to be located in board of the peripheral edge of the vertical return wall as it not possible to trim moulded pulp products such as the food containers in a horizontal direction, particularly where two pulp surfaces are spaced from each other in the manner of the return wall and the side wall of the container.

The barrier membrane preferably extends continuously and unbroken across the tear seam. This ensures that the barrier membrane does not tear when the tab portion is detached from the main body.

The tear seam may be a perforated seam, partial cut, a line of reduced thickness or any other form of mechanical weakening.

The vertical return wall preferably comprises a lower peripheral edge and the tab portion is arranged at and extends outwardly from the lower peripheral edge.

In another aspect of the invention there is provided a method of forming a moulded pulp container for food comprising:
  moulding a main body formed from a moulded pulp material, the main body comprising:
  a base;
  upstanding walls extending from the base defining a container having an inner surface and an outer surface;
  an outer return edge extending vertically downwards from an upper edge of the upstanding walls having an inner surface facing the upstanding walls and an outer surface facing outwardly away from the upstanding walls; and
    a pulp tab portion connected to and arranged outboard of the vertical return edge, the tab portion extending in a substantially horizontal direction relative to the vertical outer return wall and having an upper surface and a lower surface;
  forming a tear seam between the tab portion and the vertical return wall of the main body for enabling the pulp tab portion to be detached from the main body; and
  bonding a barrier membrane to the inner surface of the main body, the outer surface of the vertical return wall and the upper surface of the tab portion such that when the removable tab portion is detached from the main body the barrier membrane remains bonded to both the main body and the tab portion to enable the barrier membrane to be peeled from the main body by pulling the tab portion.

The step of forming the tear seam preferably comprises applying a pressing or cutting tool to the tab portion in a vertical direction relative to the horizontal direction in which the tab portion extends.

The step of forming the tear seam is preferably performed before the step of bonding the barrier membrane.

The tool is preferably moved vertically into contact with the lower surface of the tab portion.

The barrier membrane is preferably laminated to the inner surface of the main body, the outer surface of the vertical return wall and the upper surface of the tab portion.

The tear seam is preferably formed after the step of laminating the barrier membrane.

BRIEF DESCRIPTION OF DRAWINGS

The present invention will now be described by way of example only with reference to the following illustrative figures in which.

DESCRIPTION OF EMBODIMENTS

Figure 1:
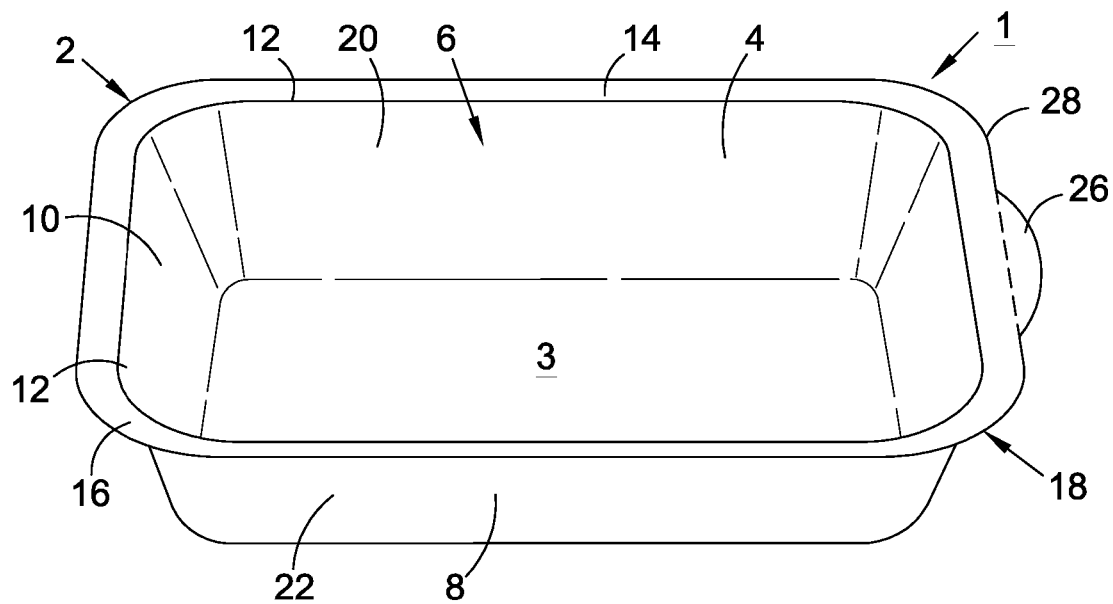
FIG. 1 shows a moulded pulp food container according to an embodiment of the present invention.

Referring to FIG. 1, there is provided a food container for containing food to be heated or served hot. The food container 1 comprises a main body 2 having a base 3 and a plurality of upstanding walls 4 defining an enclosure 6. The walls 4 include side walls 8 and end walls 10. The walls 4 include an upper edge 12. A flange section extends outwardly from the upper edge 12 defining an outwardly extending peripheral rim or lip 14. The lip 14 includes an upwardly facing planar surface 16 and a lower surface 18.

The main body 2 is formed of a moulded pulp material, which may be formed from any suitable recyclable pulp material. The main body 2 may be formed by any suitable pulp moulding technique, including transfer moulding or thermoforming. Preferably the main body 2 is thermoformed, providing the surface of the body 2 with a smooth finish.

Figure 2:
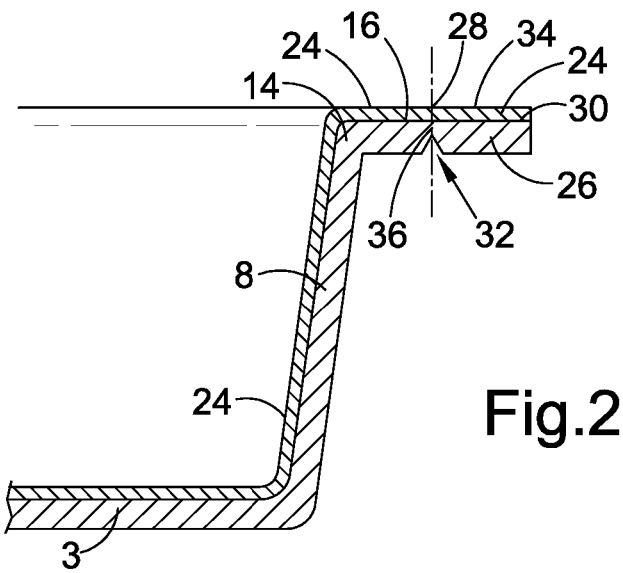
FIG. 2 shows a cross sectional view of the container of FIG. 1.

The main body 2 comprises an inner surface 20 and an outer surface 22. As shown in FIG. 2, a layer of plastic 24 is provided on the inner surface 20 of the main body 2 that forms a barrier membrane, which may for example be a waterproof membrane. The barrier membrane 24 may be formed from any plastic material suitable for forming as a thin film and bonding to a pulp material. The barrier membrane preferably comprises a polymer able to withstand temperatures of over 150° C. and preferably over 200° C. For this reason, the barrier membrane 24 may be formed from Polyethylene Terephthalate (PET) or a similar material. The thin film of PET is laminated onto the inner surface 20 of the main body 2 to form the barrier membrane 24. The lamination process bonds the barrier membrane 24 to the inner surface 20. The lamination process comprises heating the thin film of PET or other plastic and drawing the heated plastic film onto the inner surface 20 of the main body 2 using a vacuum applied at the outer surface 22. The plastic film is subsequently trimmed to remove any excess plastic surrounding the container 1.

The barrier membrane 24 covers the inner surfaces of the base 3 and side walls 4, and also extends over and covers the upper surface 16 of the lip 14. The laminated bonding between the upper surface 20 of the main body 2 and the barrier membrane 24 is such that the barrier membrane 24 may be peeled away from the inner surface 20 of the main body 2 with the application of a suitable mechanical force. However, in order to do so a person must be able to grip the barrier membrane 24 to apply the required force.

A tab 26 extends outwardly from the peripheral edge 28 of the lip 14. The tab 26 is sized and shaped to enable it to be gripped by a user between the thumb and forefinger. The tab 26 may be substantially semi-circular, square, rectangular, triangular or any suitable shape. The tab 26 is formed as part of the main body 2 and is integrally moulded with the main body 2. The shape of the tab 26 may be formed in a post moulding trimming or die cutting stage, or by any suitable means.

A tear seam 32 is created between the tab portion 26 and the main body 2. The barrier membrane 24 extends over the tear seam 32 and a tab portion 34 of the barrier membrane 24 is bonded to the upper surface 30 of the tab 26, which is coplanar and contiguous with the upper surface 16 of the lip 14. As such a continuous membrane extends across the main body 2 and the tab 26. The tab 26 is frangible and may be torn or otherwise detached from the lip 14 of the main body 2. The tear sear 32 formed between the tab 26 and the lip 14 is aligned with the peripheral edge 28 of the lip 14. In the embodiment shown in FIG. 2 the tear seam 32 is formed by a die cut linear region of reduced thickness in the pulp material extending along the boundary line between the inner edge 36 of the tab 26 and the outer peripheral edge 28 of the lip 14. Alternatively, the tear seam 32 may be formed by a series of perforations or any other means of mechanical weakening of the pulp material along the tear seam 32. The tear seam 32 may be formed by a punching, scoring, cutting or any other suitable means. Alternatively, the tear seam 32 may be formed during moulding. The tear seam 32 is formed in the pulp material of the tab 26 only, and the barrier membrane 24 extends continuously over the tear seam 32 in an unbroken manner with no reduction in thickness or strength.

Figure 3:
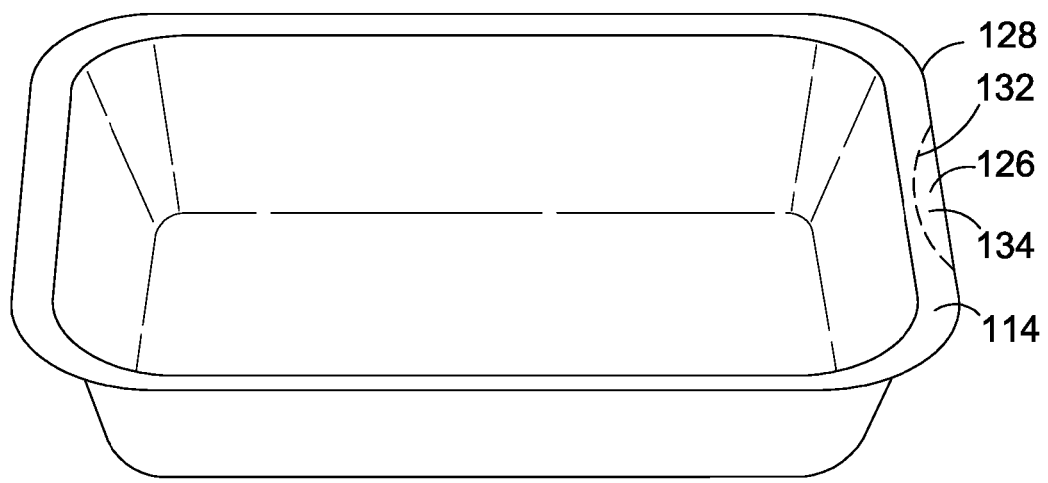
FIG. 3 shows a moulded pulp food container according to another embodiment of the present invention.

In an alternative embodiment shown in FIG. 3, the tab 126 is formed within the boundary of the peripheral edge 128 of the lip 114. As such the tab 126 extends inwardly from the peripheral edge 128 of the lip 114. The tear seam 132 extends through a section of the lip 114, defining a boundary between the lip 114 and the tab 126, with the tab 126 being a removable portion of the lip 114. In a similar manner to the first embodiment, the barrier membrane 24 extends across the tear seam 132 and a tab portion 134 is bonded to the upper surface of the tab 126.

In use the container 1 is filled with a quantity of food and a plastic cover film is applied to the container 1 to cover and seal the enclosure 6. The plastic cover film (not shown) is bonded to the container 1 along the upper surface 22 of the lip 14. The plastic cover film is bonded to the region of plastic membrane 24 covering the lip 14 by heat sealing or other means in such a manner that the plastic cover film is able to be peeled away from the lip 14 without removing or damaging the plastic membrane 24. At the point of disposal of the container 1 the user is able to remove the barrier membrane 24 by gripping the tab 26 in one hand and the main body of the container in the other and pulling the tab 26 substantially upwardly away from the lip 14. As the tab 26 is pulled in this manner the tear seam 32 in the pulp material is broken and the tab 26 tears away from the peripheral edge 28 of the main body 2. However, the barrier membrane 24 remains intact and does not tear along the tear seam 32. At this point the barrier membrane 24 is bonded to both the tab 26 and the main body 2. The tab 26 is detached from the main body 2 but remains connected thereto by the barrier membrane 24.

As the user continues to pull the tab 26, including the tab portion 34 of the barrier membrane 24, the barrier membrane 24 is peeled away from the inner surface 22 of the main body 22. The user continues to pull until the entire barrier membrane 24 has been detached from the main body 2 with only the tab 26 remaining bonded to the barrier membrane 24. The user may then dispose of the main body 2 and barrier membrane 24 as separate elements. As such, the container 1 is received at the recycling station without the plastic barrier membrane 24 and may be processed without the requirement to remove the plastic at any stage. Although it is possible that certain users may forget or decide not to remove the plastic barrier membrane 24, the overall proportion of plastic present in the macerated slurry will be reduced if a percentage of users act responsibly and follow the recycling directions by removing the barrier membrane 24 when disposing of the container 1.

Figure 4:
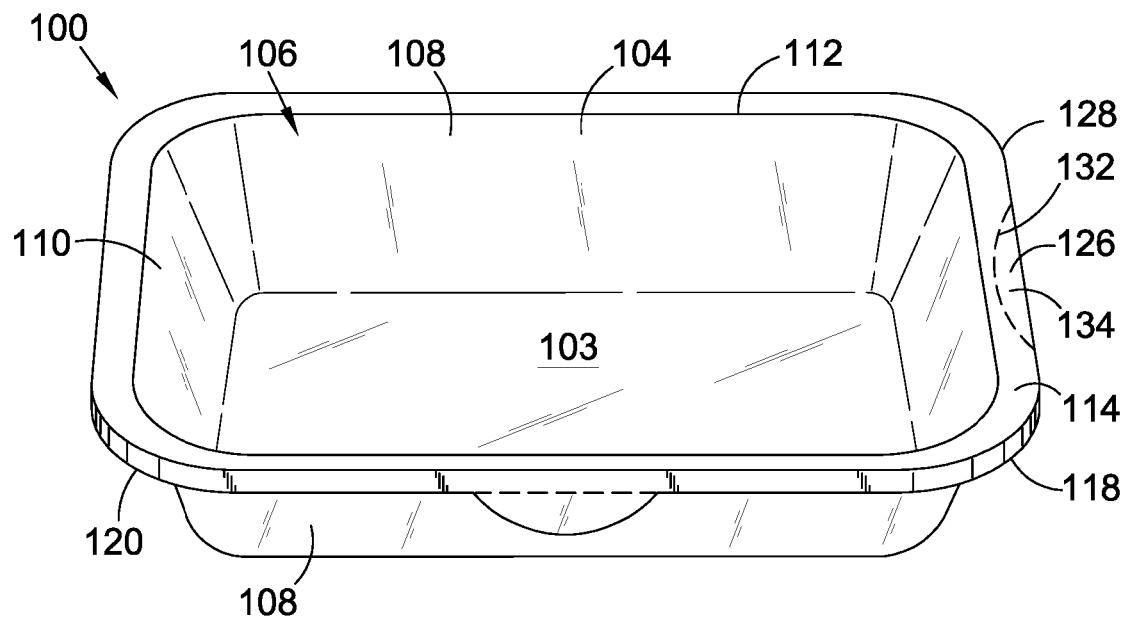
FIG. 4 shows a moulded pulp food container according to an embodiment of the present invention.
Figure 5:
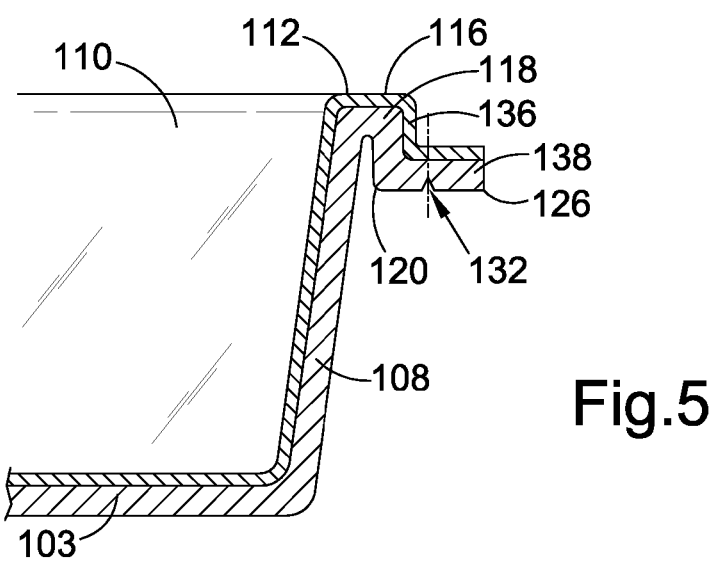
FIG. 5 shows a cross sectional view of the container of FIG. 4.

In the embodiment of FIG. 4, the food container 100 comprises a main body 102 formed of a pulp material having a base 103 and a plurality of upstanding walls 104 defining an enclosure 106. The walls 104 include side walls 108 and end walls 110. The walls 104 include an upper edge 112 with a flange section 114 extending outwardly from the upper edge 12 defining an outwardly extending peripheral lip having an upwardly facing planar surface 116. A vertical outer wall 118 extends downwardly from the outer edge of the flange 114 to create a return edge. The outer wall 118 terminates at a lower edge 120. The return edge created by the vertical outer wall 118 increases the strength of the upper rim of the container 100.

The main body 102 comprises an inner surface 121 and an outer surface 122. As shown in FIG. 4, a layer of plastic 124 is provided on the inner surface 121 of the main body 102 that forms a thin barrier membrane, as described above. The layer of plastic 124 is laminated onto and bonded to the inner surface 121 of the main body 2 to form the barrier membrane 124. The barrier membrane 124 covers the inner surfaces of the base 103 and side walls 104, and also extends over and covers the upper surface 116 of the flange 114 and the outer surface 125 of the vertical outer wall 118.

A tab 126 extends horizontally outwards from, and outboard of, the lower end 120 of the vertical side wall 118. The tab 126 is sized and shaped to enable it to be gripped by a user between the thumb and forefinger. The tab 126 may be substantially semi-circular, square, rectangular, triangular or any suitable shape. The tab 126 is formed as part of the main body 102 and is integrally moulded with the main body 102. The shape of the tab 126 may be formed in a post moulding trimming or die cutting stage, or by any suitable means. As the tab 126 projects horizontally outwards from the vertical wall, it is able to be trimmed or cut in a vertical cutting operation.

A tear seam 132 is created along the tab 126, between the tab 126 and the outer wall 118. The tear seam 32 may be a linear region of reduced thickness in the pulp material extending along the boundary line between the inner edge of the tab 126 and the outer peripheral edge of the outer wall 118. Alternatively, the tear seam 132 may be formed by a cut, series of perforations or any other means of mechanical weakening of the pulp material along the tear seam 132. The tear seam 132 may be formed by punching, scoring, cutting or any other suitable means. These operations are performed vertically on the tab 126, which extends horizontally away from the vertical outer wall 118, having an outer edge 138 that is horizontally outboard of the outer surface 136 of the outer wall 118. Following lamination of the container 100, the container 100 is inverted and a cutting tool is brought vertically downwards into engagement with the lower surface of the tab 126. The blade of the cutting tool is configured and arranged to partially cut through the tab 126, thereby creating a weakened region defining the tear seam. It would not be possible to perform these operations in a horizontal direction, as would be required if the tab 132 were to extend vertical downwards from the end of the vertical outer wall 118, as the cutting process requires a support surface to be located on the opposing side of the material being cut. The cutting process must also be conducted in a single direction, in a single plane, whereas cutting horizontally around the periphery of the container would require cutting through 360 degrees.

The tear seam 132 is formed in the pulp material of the tab 126 only, and the barrier membrane 124 preferably extends continuously over the tear seam 132 in an unbroken manner with no reduction in thickness or strength. The barrier membrane 124 extends over the tear seam 132 and a tab portion 134 of the barrier membrane 124 is bonded to the upper surface 130 of the tab 126, which is vertically spaced below the upper surface 116 of the flange 114. The tab 126 is frangible and may be torn or otherwise detached from its connection with the vertical outer wall 118 along the tear seam 132.

In use the plastic cover film is bonded to the container 100 along a bonding region extending along the upper rim defined by the upper surface 116 of the flange 114. In containers having a flange at the upper edge, where the laminate film extends to and terminates at the outer edge of the flange, the plastic cover film and the laminate film are bonded together at a common outer edge, or close thereto, and in the same plane. It has been found in such arrangements that when the plastic cover film is removed, the bond between the cover film and the laminate layer causes a peeling force to be applied directly to the outer edge of the laminate layer, at the outer edge of the flange. The strength of the bond between the plastic layer and the laminate layer is such that, rather than the plastic film peeling away from the laminate layer, the two remain bonded and the laminate layer is peeled away from the pulp container together with the lidding film. As a result, the food remains within a sealed plastic pouch formed by the plastic cover and the laminate layer, that is separated from the pulp container. Such an arrangement is clearly not desirable.

The return edge formed by the vertical outer wall 18 extends the outer edge of the laminate layer 124 away from the upper surface 116 of the flange and the bonding region between the plastic cover layer and the laminate layer 124. Therefore, the peeling force applied to the laminate layer 124 when the plastic cover is removed is inwardly and vertically offset from the outer edge of the laminate layer 124 and the peripheral bonding region between the laminate layer 124 and the main body 102 and in a plane perpendicular to the bonding between the barrier layer 124 and the outer wall 118. Therefore, there is no direct force applied to the outer region of edge bonding between the main body 102 and the barrier membrane 124 and the peeling force form the plastic cover layer is perpendicular to the plane of the required peeling force at the outer edge, and as such the plastic layer is able to be easily and safely removed without any debonding between the main body 102 and the laminate layer 124.

To remove the laminate barrier membrane 124 the user grips the tab 126 and pulls the tab 126 substantially upwardly and outwardly away from the outer wall 118. As the tab 26 is pulled the tear seam 132 in the pulp material is broken and the tab 126 tears away from the outer wall 118. The laminate barrier membrane 124 does not tear along the tear seam 32 and the tab section 134 remains attached to the rest of the barrier membrane 124. The tab 126 is detached from the main body 102 but remains connected to the barrier membrane 124, which is bonded to both the tab 126 and the main body 102. The barrier membrane 124 is therefore peeled away from the inner surface of the main body 102 as the user continues to pull the tab 126, until the entire barrier membrane 124 has been detached from the main body 102 with only the tab 126 remaining bonded to the barrier membrane 124.

The invention claimed is:

1. A moulded pulp container for food comprising:
   a main body comprising:
      a base;
      upstanding walls extending from the base, the upstanding walls having an upper end and a lower end;
      an upper rim at the upper end of the upstanding walls, the upper rim having an outer edge;
      an outer return edge extending vertically downwards from the upper rim and having an inner surface facing the upstanding walls and an outer surface facing outwardly away from the upstanding walls; and
      a bonding region extending along the upper rim configured for bonding to a lidding film;
      wherein the base and the upstanding walls define a container having an inner surface and an outer surface; and
      wherein the main body is formed from a moulded pulp material; and
   a barrier membrane bonded to the inner surface of the container and comprising a tab portion extending past the outer edge of the upper rim;
   wherein the tab portion is connected to and extends outboard of the outer return edge in a substantially horizontal direction relative to a vertical outer return wall of the outer return edge and defines a pull tab configured to enable the barrier membrane to be pulled from the main body; and
   wherein the upper rim defines a first plane and an upper surface of the tab portion defines a second plane that is vertically offset below the first plane.

2. The moulded pulp container according to claim 1 further comprising a pulp tab portion extending from the outer edge;
   wherein a tear seam is formed between the pulp tab portion and the main body.

3. The moulded pulp container according to claim 2, wherein the tab portion of the barrier membrane is bonded to the upper surface of the pulp tab portion; and
   wherein the barrier membrane is further bonded to the inner surface of the container and the outer surface of the vertical outer return wall.

4. The moulded pulp container according to claim 3, wherein a tear seam is formed between the pulp tab portion and the vertical outer return wall to enable the pulp tab portion to be detached from the main body; and
   wherein the barrier membrane is bonded to the main body and the pulp tab portion such that when the pulp tab portion is detached from the main body, the barrier membrane remains bonded to both the main body and the pulp tab portion to enable the barrier membrane to be peeled from the main body by pulling the pulp tab portion.

5. The moulded pulp container according to claim 4, wherein the barrier membrane extends continuously and unbroken across the tear seam.

6. The moulded pulp container according to claim 2, wherein the vertical outer return wall comprises a lower peripheral edge; and
   wherein the pulp tab portion is arranged at and extends outwardly from the lower peripheral edge.

7. The moulded pulp container according to claim 1, wherein the barrier membrane is a polymer film.

8. The moulded pulp container according to claim 7, wherein the polymer is a plastic.

9. The moulded pulp container according to claim 8, wherein the plastic comprises polyethylene terephthalate.

10. The moulded pulp container according to claim 1, wherein the barrier membrane is a waterproof membrane.

11. A method of forming a moulded pulp container for food comprising:
    moulding a main body from a pulp material, the main body comprising:
       a base;
       upstanding walls extending from the base, the upstanding walls having an upper end and a lower end;
       an upper rim at the upper end of the upstanding walls, the upper rim defining a first plane and having an outer edge;
       an outer return edge extending vertically downwards from the upper rim and having an inner surface facing the upstanding walls and an outer surface facing outwardly away from the upstanding walls; and
       a bonding region extending along the upper rim configured for bonding to a lidding film;
       wherein the base and the upstanding walls define a container having an inner surface and an outer surface; and
    bonding a barrier membrane to the inner surface of the container such that a tab portion of the barrier membrane:
       extends past an outer edge of the upper rim;
       is connected to and extends outboard of the outer return edge in a substantially horizontal direction relative to a vertical outer return wall of the outer return edge;
       defines a pull tab that may be gripped to peel the barrier membrane from the main body; and
       has an upper surface defining a second plane that is vertically offset below the first plane.

12. The method according to claim 11 further comprising forming a tear seam;
    wherein the pulp container further comprises a pulp tab portion extending from the outer edge; and
    wherein the tear seam is formed between the pulp tab portion and the main body.

13. The method according to claim 12 further comprising forming a tear seam;
    wherein the tear seam is formed between the pulp tab portion and the vertical outer return wall.

14. The method according to claim 13 further comprising:
    bonding the tab portion of the barrier membrane to the upper surface of the pulp tab portion; and
    bonding the barrier membrane further to the inner surface of the container and the outer surface of the vertical outer return wall such that when the pulp tab portion is detached from the main body, the barrier membrane remains bonded to both the main body and the pulp tab portion to enable the barrier membrane to be peeled from the main body by pulling the pulp tab portion.

15. The method according to claim 14, wherein forming the tear seam comprises applying a tool to the pulp tab portion in a vertical direction relative to the horizontal direction in which the pulp tab portion extends.

16. The method according to claim 15, wherein the tool is moved vertically into contact with the lower surface of the pulp tab portion; and wherein the tool is selected from the group consisting of a pressing tool and a cutting tool.

* * * * *